W. J. FRIED.
AIR BRAKE SYSTEM.
APPLICATION FILED MAY 28, 1917.
1,243,727.
Patented Oct. 23, 1917.
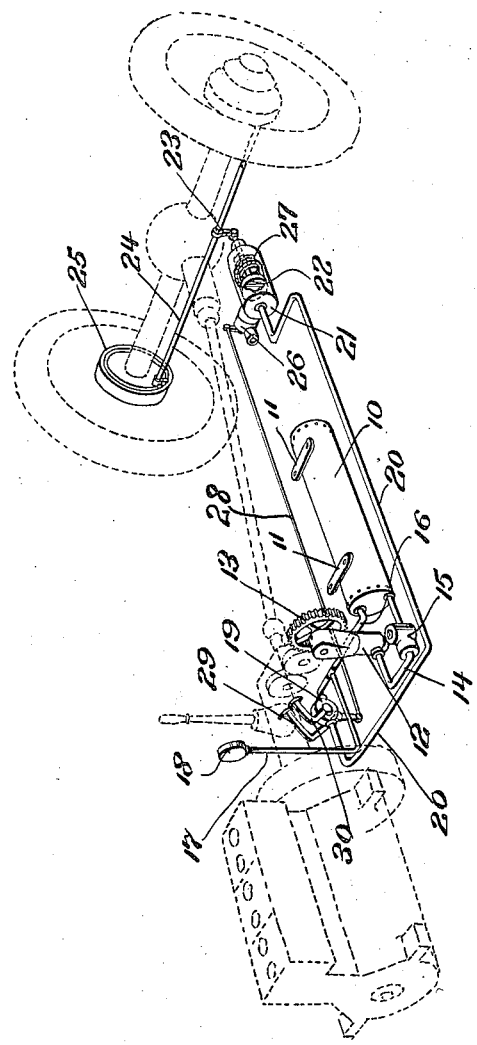
WITNESSES
INVENTOR
William J. Fried,
BY
ATTORNEY

UNITED STATES PATENT OFFICE.

WILLIAM J. FRIED, OF FOUNTAIN CITY, WISCONSIN.

AIR-BRAKE SYSTEM.

1,243,727.	Specification of Letters Patent.	Patented Oct. 23, 1917.

Application filed May 28, 1917. Serial No. 171,541.

*To all whom it may concern:*

Be it known that I, WILLIAM J. FRIED, a citizen of the United States, residing at Fountain City, in the county of Buffalo and State of Wisconsin, have invented certain new and useful Improvements in Air-Brake Systems, of which the following is a specification.

This invention relates to an improved air brake for use in connection with an automobile and the principal object of the invention is to provide an air brake which may be mounted beneath the body of the car and extend longitudinally thereof, the air brake being so constructed that the supply for forcing air into the storage tank may be actuated from the transmission of the automobile and further the air brake so constructed that it may be controlled by the driver through the medium of levers mounted in the running board.

Another object of the invention is to so construct this air brake system that the amount of pressure applied may be controlled through the medium of one valve and to further so construct the brake that the air may be easily released from the cylinder.

Another object of the invention is to provide an air brake system for an automobile which will be very compact and which will take up a minimum amount of space.

This invention is illustrated in the accompanying drawings, wherein there is shown the air brake system, a portion of an automobile being indicated in connection with the air brake system.

This air brake system includes a storage tank 10 provided with cross strips 11 or other means with which the tank may be connected with the body of an automobile. A pump 12 is mounted adjacent the engine and includes a gear 13 for permitting motion to be transmitted from the transmission of the automobile to actuate the pump. A pipe or conduit 14 leads from this pump 12 and communicates with the storage tank 10, a check valve 15 being positioned intermediate the length of the pipe 14 so that the air will be retained in the storage tank under pressure and only permitted to leave the storage tank through the outlet pipe 16. This outlet pipe 16 is provided with a branch 17 carrying an indicating gage 18 for showing the amount of pressure and from an inspection of the drawing it will be seen that this pipe 16 communicates with the control valve 19 which when opened permits the air to pass through pipe 20 into the cylinder 21 positioned adjacent the axle of the automobile. By means of this valve 19, the amount of air passing into the pipe 20 can be easily controlled. This cylinder 21 carries a piston 22 having its stem extending through the end of the cylinder and connected with the lever 23 of the rod 24 which rod is connected with the band brake 25. When the air is applied, the piston moves to rotate the rod 24 and apply the brakes and when the air is released through the medium of the releasing valve 26, the spring 27 which engages the piston 22 returns the piston to the normal position and not only expels the air through the releasing valve but also moves the rod 24 to release the brakes. This releasing valve is controlled through the medium of a rod 28 and actuating treadle 29 which is positioned adjacent the treadle 30 of the valve 19 and it will thus be seen that both the valve 19 and the valve 26 can be easily controlled by the driver of the car. It is of course understood that if desired, a cylinder could be provided for the forward axle in which case, the pipe 20 would be provided with a branch leading to this second cylinder.

It will thus be seen that a very simple and efficient air brake has been applied to the automobile and further that this device is so constructed that the air may be pumped into the tank through the medium of the automobile transmission.

What is claimed is:—

1. An air brake apparatus for an automobile comprising a storage tank, a pump for forcing air into the storage tank having operative connection with the driving element of an automobile, brake means, a cylinder having a valve controlled outlet, a piston slidably mounted in the cylinder and extending through the same and connected with the brake means, means for opening and closing the valve of the cylinder including an actuating lever and a connection between the lever and the valve, and a valve controlled conduit leading from the storage tank to the cylinder for admitting air under pressure to the cylinder to move the piston outwardly and move the brake means to an operative position.

2. An air brake system for an automobile comprising a storage tank, a brake operating shaft, a lever extending from the brake operating shaft, a cylinder, a piston slidable in the cylinder and having a stem extending through one end thereof and connected with the lever, a spring in the cylinder engaging the piston and normally holding the same in a position to release the brake, a conduit leading from the storage tank and communicating with the cylinder for admitting air thereto under pressure to move the piston outwardly and apply the brakes, a control valve positioned intermediate the length of the conduit pipe, a release valve having communication with the cylinder, means for opening and closing the release valve including an actuating element and a rod leading from the actuating element and connected with the release valve, a pump including operating mechanism for actuation from the propelling means of an automobile, and a conduit leading from the pump and having communication with the storage tank.

In testimony whereof I affix my signature in presence of two witnesses.

WILLIAM J. FRIED.

Witnesses:
   EMIL J. FLOWER,
   VALENTINE THOENY.